(12) United States Patent
Lee et al.

(10) Patent No.: US 7,938,024 B2
(45) Date of Patent: May 10, 2011

(54) WEIGHT SENSING DEVICE FOR VEHICLES

(75) Inventors: Chul-Sub Lee, Daegu (KR);
Young-Deok Kim, Seoul (KR);
Jin-Kwang Kim, Kyung-Nam (KR);
You-Sik Choi, Daegu (KR); Seong-Jin Park, Seoul (KR); Eul-Chul Byeon, Gyonggi (KR); Jin-Hyuk Kwak, Kyung-Buk (KR)

(73) Assignee: Tyco Electronics AMP Korea Ltd., Kyungsangbuk-do (KR)

( * ) Notice: Subject to any disclaimer, the term of this patent is extended or adjusted under 35 U.S.C. 154(b) by 220 days.

(21) Appl. No.: 12/339,949

(22) Filed: Dec. 19, 2008

(65) Prior Publication Data

US 2009/0158860 A1 Jun. 25, 2009

(30) Foreign Application Priority Data

Dec. 20, 2007 (KR) .................. 10-2007-0134694

(51) Int. Cl.
*G01L 3/16* (2006.01)
(52) U.S. Cl. ................................. 73/862.045
(58) Field of Classification Search .......... 73/862.041–862.046
See application file for complete search history.

(56) References Cited

U.S. PATENT DOCUMENTS

| 4,483,203 | A | * | 11/1984 | Capper ............... 73/862.042 |
|-----------|---|---|---------|----------|
| 4,773,120 | A | * | 9/1988 | Wang ............... 15/344 |
| 4,823,618 | A | * | 4/1989 | Ramming ............... 73/862.045 |
| 4,996,882 | A | * | 3/1991 | Kistler ............... 73/777 |
| 6,871,552 | B2 | * | 3/2005 | Liu et al. ............... 73/862.041 |
| 6,882,281 | B2 | * | 4/2005 | Curtis et al. ............... 340/667 |
| 7,047,823 | B2 | | 5/2006 | Wilkie et al. |
| 7,189,931 | B2 | | 3/2007 | Hida et al. |
| 7,255,015 | B2 | | 8/2007 | McBride et al. |
| 7,377,178 | B2 | * | 5/2008 | Kobayashi et al. ............. 73/761 |
| 7,427,720 | B2 | | 9/2008 | Furukawa et al. |

* cited by examiner

*Primary Examiner* — Max Noori
(74) *Attorney, Agent, or Firm* — Barley Snyder, LLC

(57) ABSTRACT

A weight sensing device providing an accurate measurement of only a passenger's vertical load without an interference of moment and lateral load caused upon sudden braking and a variation in traveling conditions of a vehicle. The weight sensing device includes a sensor body having a center hole for fastening of the sensor body with a seat frame, a diaphragm provided around the center hole, a pair of fixing holes provided at opposite sides of the center hole and arranged coaxially with the center hole for fastening of the sensor body with a slide rail, supporting planes containing the fixing holes and located at opposite sides of the diaphragm, and a mounting recess defined between the diaphragm and the supporting planes, a semiconductor strain gauge and a printed circuit board attached to the diaphragm of the sensor body, and a connector electrically connected with the printed circuit board, to transmit a value output from the semiconductor strain gauge to an airbag controller.

8 Claims, 11 Drawing Sheets

WEIGHT SENSING DEVICE FOR VEHICLES

CROSS-REFERENCE TO RELATED APPLICATIONS

This application claims the benefit of the filing date under 35 U.S.C. §119(a)-(d) of Korean Patent Application No. 10-2007-0134694, filed Dec. 20, 2007.

FIELD OF THE INVENTION

The present invention relates to a weight sensing device for vehicles, and more particularly, to a weight sensing device for vehicles, which has a simplified single body configuration and a relatively low overall height, thereby having compatibility in installation and use regardless of various kinds of vehicles having different seat heights.

BACKGROUND

Generally, a weight sensing device for vehicles is designed to provide data about the weight of a passenger to an airbag controller, which determines an explosion range of an airbag by taking into consideration a distance between an installed position of the airbag and the passenger, a position and weight of the passenger, and the like.

A conventional weight sensing device for vehicles is configured in such a manner that a metal member, to which a typical strain gauge is attached, is installed underneath a passenger seat, to measure a strain caused by a vertical load of a passenger. However, the strain gauge is adapted to measure a strain due to moment and lateral load caused upon sudden braking or a variation in traveling conditions of a vehicle, as well as stain caused by the vertical load, and therefore, has difficult accurately measuring only a weight of the passenger.

For this reason, recently, a weight sensing device for vehicles has been proposed, wherein a semiconductor strain gauge, which has a high sensitivity to even a slight strain, is attached to a diaphragm which serves to compensate for moment or lateral load. Now, the conventional weight sensing device for vehicles will be described in more detail.

The conventional weight sensing device for vehicles, to which the semiconductor strain gauge is attached, as shown in FIG. 1, includes an upper cover 110 fastened to a seat frame 100, and a lower support 120 fastened to a slide rail 200 and adapted to support a center diaphragm 121, the upper cover 110 and lower support 120 being arranged opposite each other on the same vertical axis. If a vertical load of a passenger is applied to the weight sensing device, a hollow press portion 111 formed at a tip end of the upper cover 110 presses a flange portion 122 of the lower support 120 formed around an outer periphery of the diaphragm 121, causing deformation of the diaphragm 121 and allowing a semiconductor strain gauge 130 attached to the diaphragm 121 to measure a weight of the passenger.

However, in the above-described conventional weight sensing device for vehicles, wherein the vertical load of the passenger is input and output on the same axis and the weight sensing device is divided into two bodies including the upper cover 110 and lower support 120, acquisition of an accurate measured value is difficult if axes of the upper cover 110 and lower support 120 are inconsistent with each other. In particular, the conventional weight sensing device must be designed to a high entire height and has difficulty in compatible use with all kinds of vehicles

SUMMARY OF THE INVENTION

The present invention has been made in view of the above problems, and it is an object of the present invention to provide a weight sensing device for vehicles, which has a simplified single body configuration and a relatively low overall height, thereby having compatibility in installation and use regardless of various kinds of vehicles having different seat heights. The weight sensing device provides an accurate measurement of only a passenger's vertical load without an interference of moment and lateral load caused upon sudden braking and a variation in traveling conditions of a vehicle.

The weight sensing device for vehicles includes a sensor body having a center hole for fastening of the sensor body with a seat frame, a diaphragm provided around the center hole, a pair of fixing holes provided at opposite sides of the center hole and arranged coaxially with the center hole for fastening of the sensor body with a slide rail, supporting planes containing the fixing holes and located at opposite sides of the diaphragm, and a mounting recess defined between the diaphragm and the supporting planes. Additionally, a semiconductor strain gauge and a printed circuit board attach to the diaphragm of the sensor body, and a connector electrically connected with the printed circuit board, to transmit a value output from the semiconductor strain gauge to an airbag controller.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENT(S)

Figure 1:
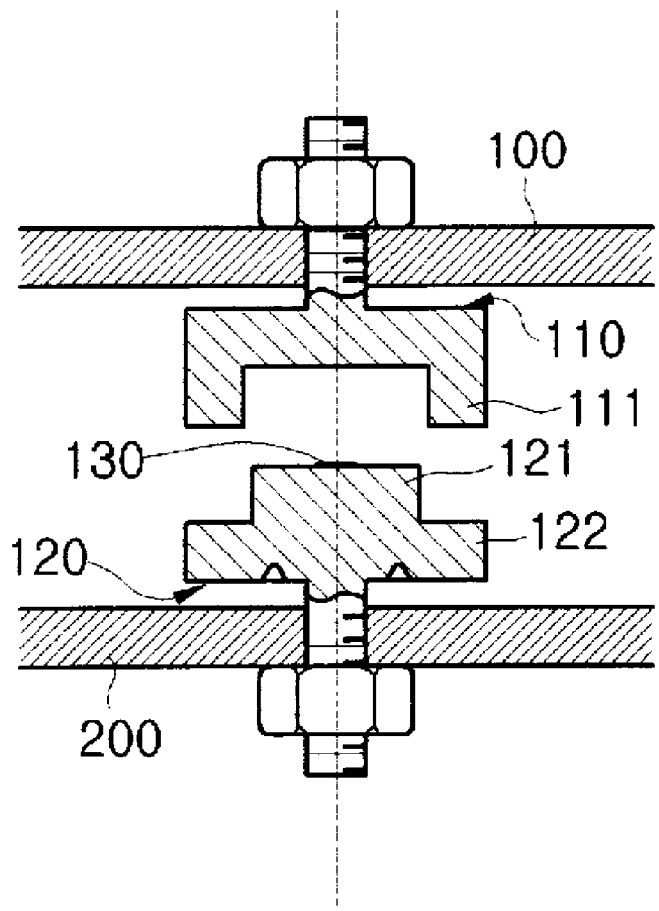
FIG. 1 is a sectional view schematically illustrating a conventional weight sensing device for vehicles.

Hereinafter, a configuration of a weight sensing device for vehicles according to different embodiments of the present invention will be described in detail with reference to the accompanying drawings.

Referring now to the drawings, a first embodiment of the invention will be described hereinbelow in detail.

Figure 2:
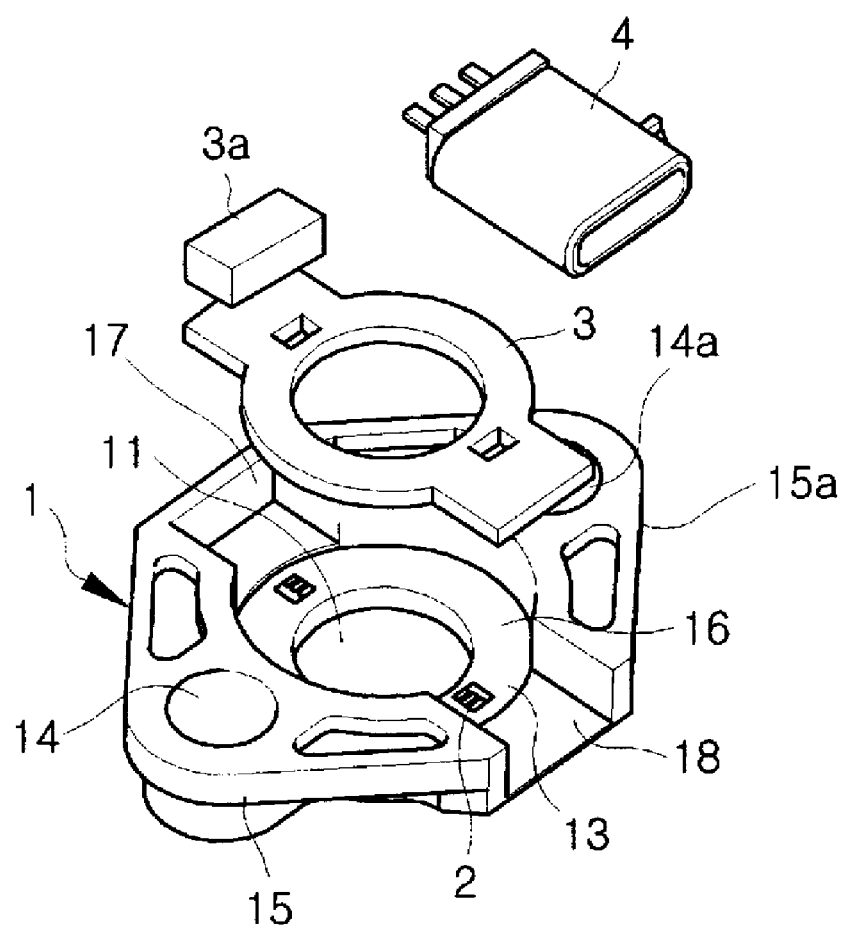
FIG. 2 is an exploded perspective view illustrating an overall configuration of a first embodiment according to the present invention, when viewed from the bottom.
Figure 3A:
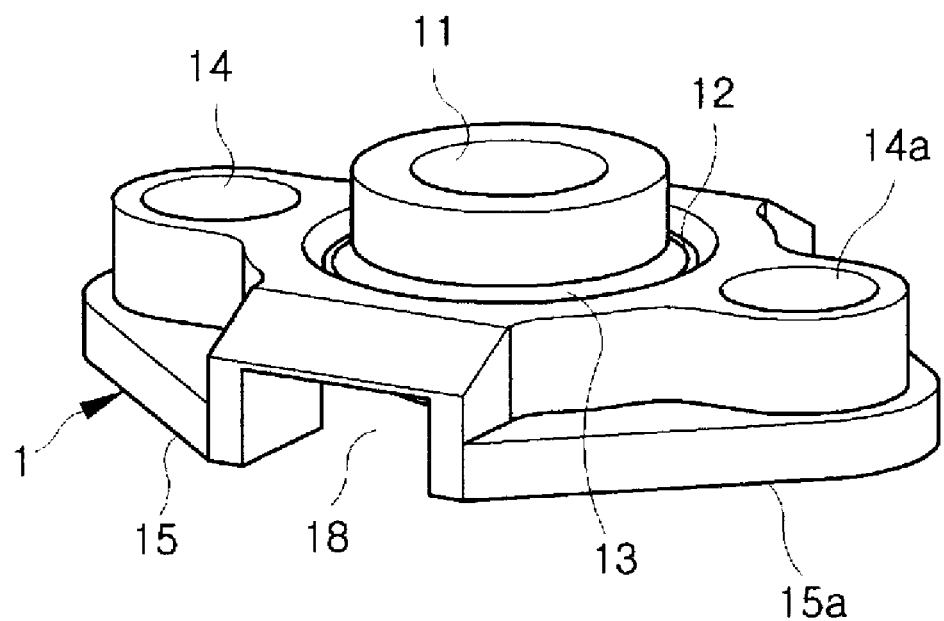
FIGS. 3A and 3B are, respectively, a perspective view and a sectional view illustrating a configuration of a sensor body of FIG. 2.
Figure 3B:
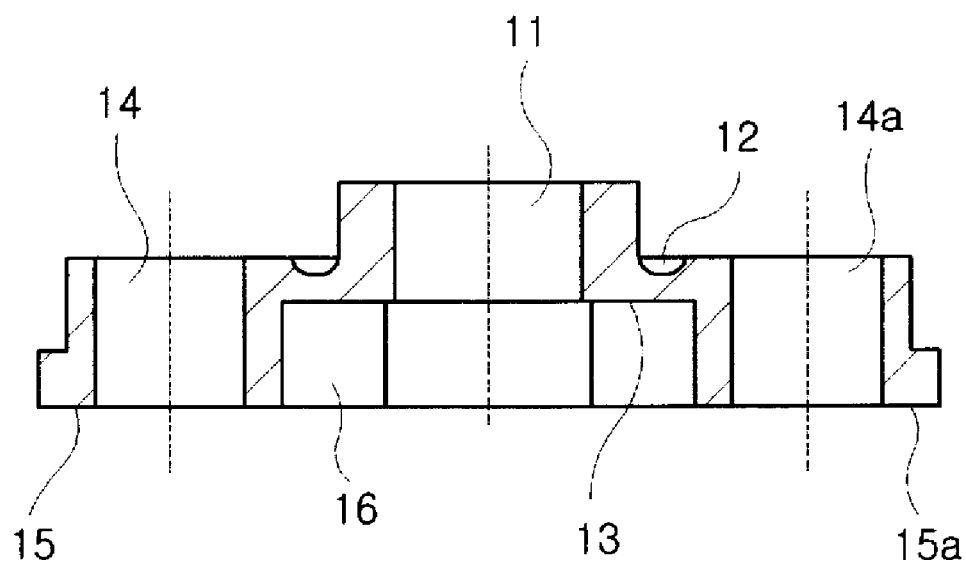

FIG. 2 is an exploded perspective view illustrating an entire configuration of a first embodiment according to the present invention, when viewed from the bottom, and FIGS. 3A and 3B are, respectively, a perspective view and a sectional view illustrating a configuration of a sensor body shown in FIG. 2.

As shown, the weight sensing device for vehicles includes a sensor body 1, a printed circuit board 3, and a connector 4. The present embodiment has a feature in that the weight sensing device includes a single body having a low height.

For this, the sensor body 1 has a center hole 11 for bolt-fastening of the sensor body 1 with a seat frame 100, and a pair of fixing holes 14 and 14a at opposite sides of the center hole 11 for bolt-fastening of the sensor body 1 with a slide rail 200 below the seat frame 100. The center hole 11 and fixing holes 14 and 14a are coaxially arranged.

The sensor body 1 further has a center diaphragm 13 containing the center hole 11, and a pair of supporting planes 15 and 15a containing the fixing holes 14 and 14a, the supporting planes 15 and 15a being located at opposite sides of the diaphragm 13 at a lower height than the diaphragm 13. A mounting recess 16 for insertion of the printed circuit board 3 is defined between the center hole 11 of the diaphragm 13 and the supporting planes 15 and 15a. A semiconductor strain gauge 2 is attached to a lower surface of the diaphragm 13 in the mounting recess 16. An annular notch 12 is formed at an upper surface of the diaphragm 13 around the center hole 11, to assure easy operation of the diaphragm 13.

A chip seating recess 17 for a chip 3a and a connector seating recess 18 for the connector 4 are provided at corresponding positions about the center hole 11 such that the chip seating recess 17 and connector seating recess 18 are arranged at opposite sides of the mounting recess 16 about a center axis of the center hole 11 perpendicular to an alignment axis of the center hole 11 and fixing holes 14 and 14a. Exteriors of the semiconductor strain gauge 2, printed circuit board 3, chip 3a and connector 4 are subjected to protective molding treatment.

With the above-described configuration, if a passenger sits in a passenger seat, an operating load is applied to the diaphragm 13 of the sensor body 1, which is bolted to the seat frame 100 through the center hole 11, causing a strain of the diaphragm 13. The semiconductor strain gauge 2, attached to the lower surface of the diaphragm 13, measures the strain of the diaphragm 13. The measured value is input to an airbag controller via the connector 4.

Figure 6:
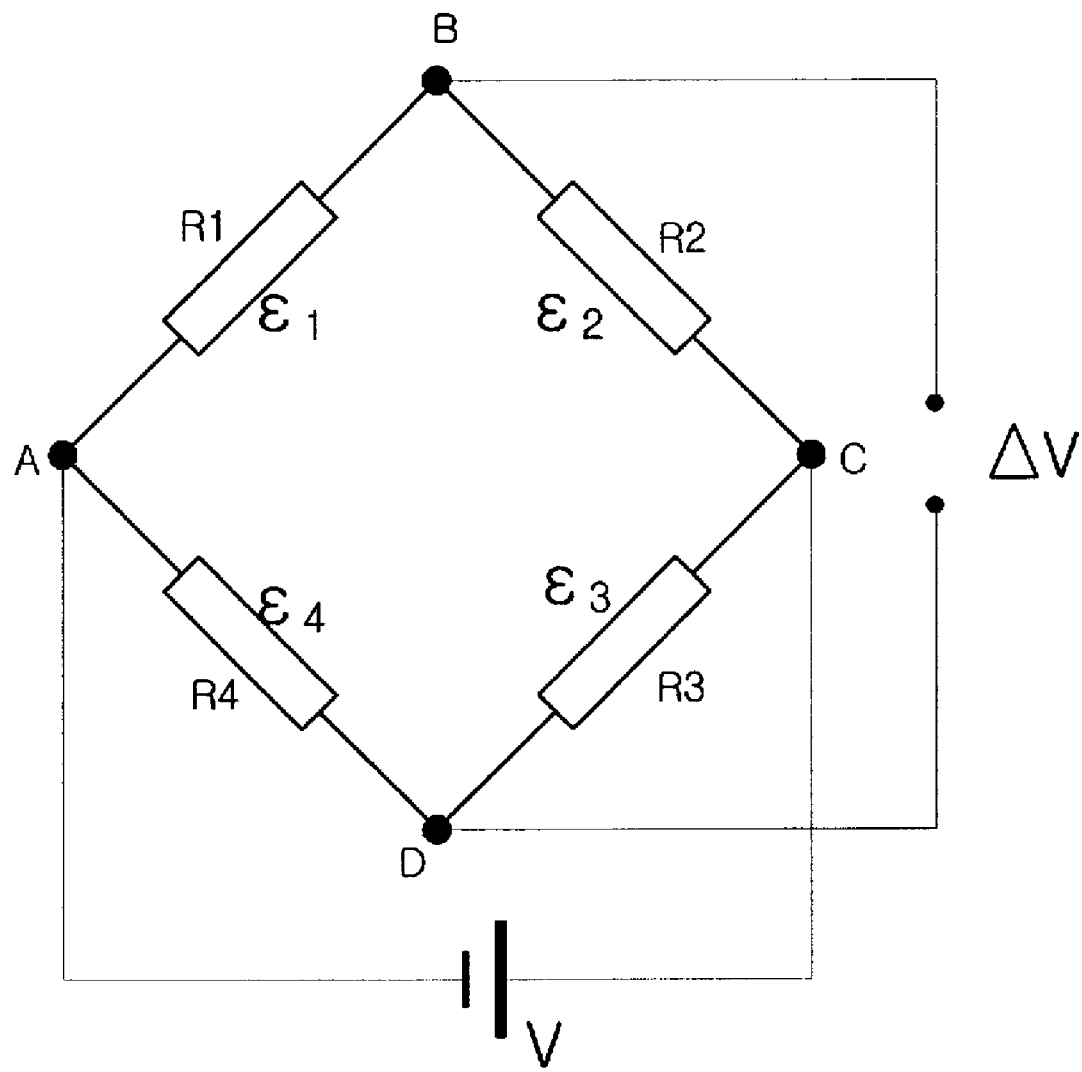
FIG. 6 is a circuit diagram of a Wheatstone bridge.

To assure optimum performance of the weight sensing device, it is noted that requirements with respect to an operating load and temperature load as proposed hereinafter must be fulfilled. With the use of a Wheatstone bridge shown in FIG. 6, a strain value can be calculated by the following Equation 1.

$$\frac{\Delta V}{V} = \frac{K}{4}(\varepsilon_1 - \varepsilon_2 + \varepsilon_3 - \varepsilon_4)$$ Equation 1

To effectively measure a strain caused by an operating load, a requirement wherein a total of measured values has a positive value or negative value must be fulfilled. Further, to effectively prevent noise in measured values due to thermal deformation according to a variation in temperature, a requirement wherein strain values measured from respective detecting elements based on Equation 1 can counterbalance each other and thus, have a zero value must be fulfilled.

Specifically, to provide optimum performance of the weight sensing device, it is necessary to find a position capable of simultaneously fulfilling the above-described requirements related to operating load and temperature load, so as to attach a semiconductor strain gauge to the position.

For this, first to fourth pressure detecting elements $\varepsilon_1$ to $\varepsilon_4$ of the semiconductor strain gauge 2 are attached to the diaphragm 13 coaxial with the center hole 11 such that the first pressure detecting element $\varepsilon_1$ and third pressure detecting element $\varepsilon_3$ are first attached to correspond to each other. Subsequently, the second pressure detecting element $\varepsilon_2$ and fourth pressure detecting element $\varepsilon_4$ are attached to correspond to each other.

Figure 4:
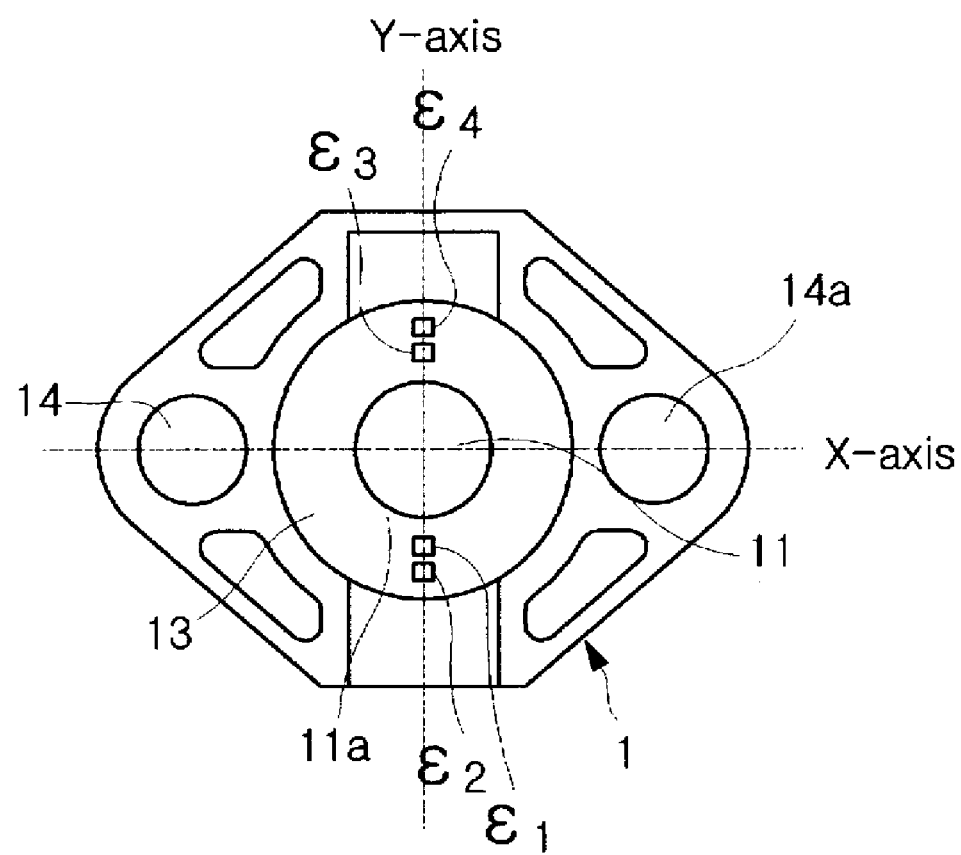
FIG. 4 is a layout diagram illustrating attachment positions of a semiconductor strain gauge of FIG. 2.

FIG. 4 is a layout diagram illustrating attachment positions of the semiconductor strain gauge according to the first embodiment of the present invention. As shown, assuming that an axis passing through the center hole 11 and the fixing holes 14 and 14a at opposite sides of the center hole 11 is an X-axis and a center axis of the center hole 11 perpendicular to the X-axis is a Y-axis, the corresponding first and third pressure detecting elements $\varepsilon_1$ and $\varepsilon_3$ and the corresponding second and fourth pressure detecting elements $\varepsilon_2$ and $\varepsilon_4$ of the semiconductor strain gauge 2 are sequentially attached to the diaphragm 13 at opposite sides of the center hole 11 along the Y-axis. It was found that this arrangement simultaneously fulfills the requirements related to operating load and temperature load.

Figure 5A:
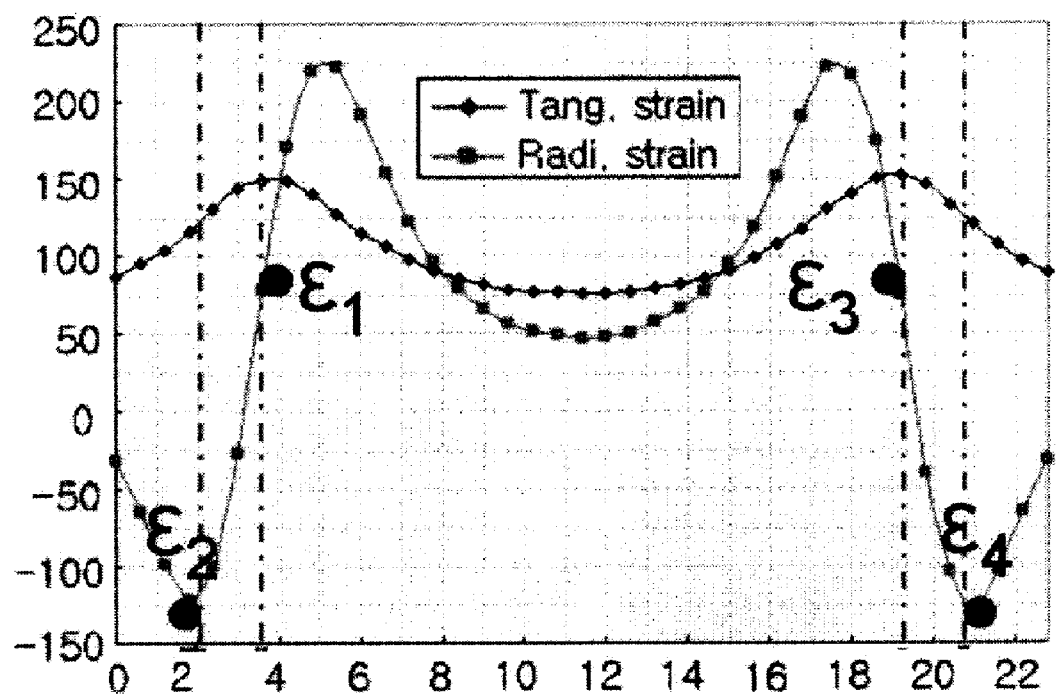
FIGS. 5A and 5B are graphs, respectively, illustrating a relationship between strain measured by the semiconductor strain gauge and operating load and a relationship between the strain and temperature load, on the basis of the layout of FIG. 4.
Figure 5B:
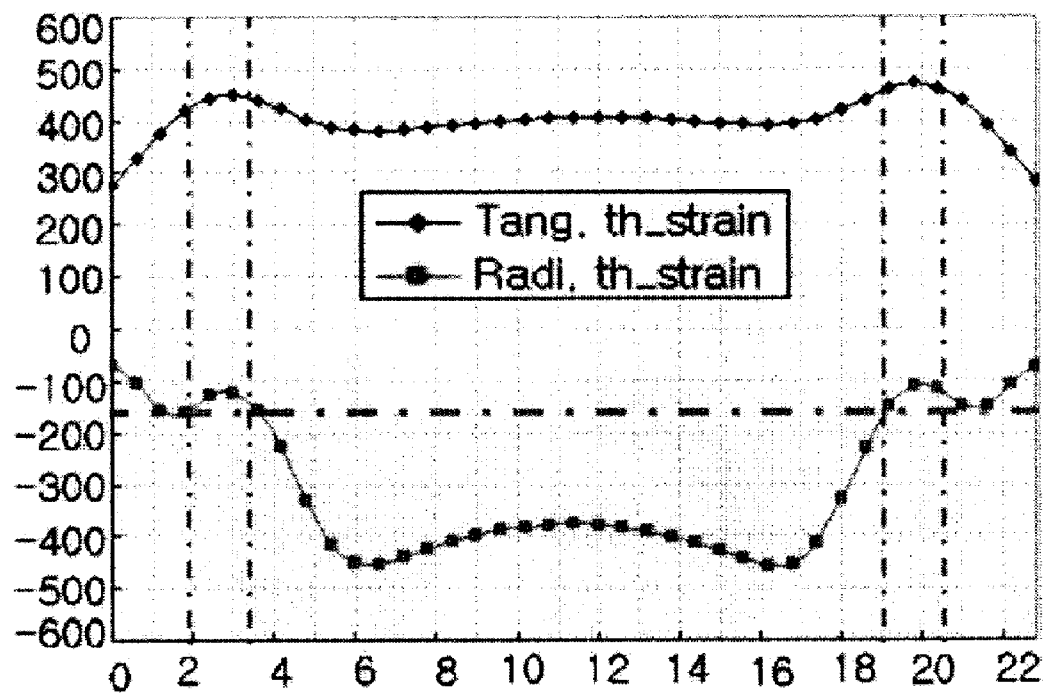

More specifically, although no attachment position of the semiconductor strain gauge 2 is found on the X-axis, with respect to certain positions of the Y-axis as represented by dash-dotted lines, when an operating load is applied to the semiconductor strain gauge 2, the first and third pressure detecting elements $\varepsilon_1$ and $\varepsilon_3$ are stretched (increased) and the second and fourth pressure detecting elements $\varepsilon_2$ and $\varepsilon_4$ are contracted (decreased) as shown in FIG. 5A, whereby a positive strain value is measured under the influence of the operating load. Referring to FIG. 5B, all the first, second, third and fourth pressure detecting elements $\varepsilon_1$, $\varepsilon_2$, $\varepsilon_3$ and $\varepsilon_4$ are compressed (decreased) with respect to a horizontal dash-dotted line, whereby all the measured values counterbalance each other and a zero value is measured.

Accordingly, when the first and third pressure detecting elements $\varepsilon_1$ and $\varepsilon_3$ and the second and fourth pressure detecting elements $\varepsilon_2$ and $\varepsilon_4$ are sequentially attached, to correspond to each other, to the diaphragms 13 at opposite sides of the center hole 11 along the Y-axis as the center axis of the center hole 11 perpendicular to the X-axis passing through the centers of the center hole 11 and fixing holes 14 and 14a, both the requirements related to operating load and temperature load are fulfilled, resulting in optimum performance of the weight sensing device.

The attachment positions of the semiconductor strain gauge 2, as described above, are determined to fulfill the requirements related to operating load and temperature load. When considering only operating load, if the attachment positions are coaxial with the center axis of the center hole regardless of the X-axis and Y-axis, the above-described requirement, i.e. that a total of measured values has a positive value or negative value, can be fulfilled.

A second embodiment of the invention will be described hereinbelow in detail.

Figure 7:
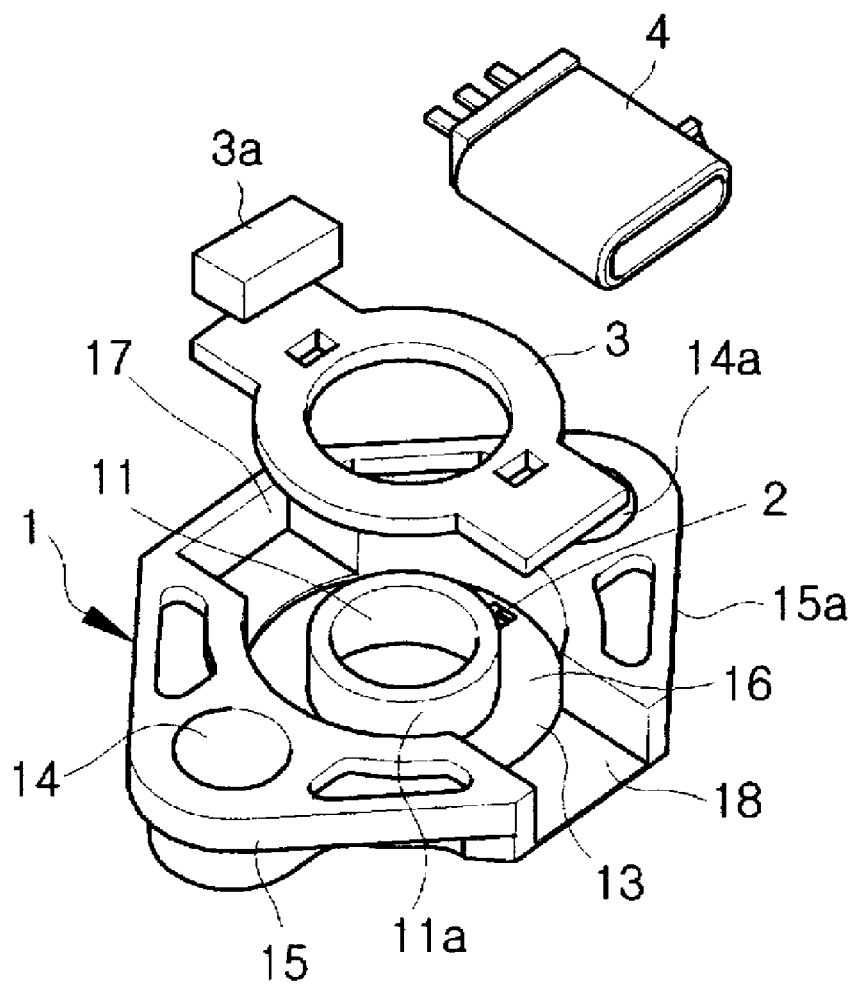
FIG. 7 is an exploded perspective view illustrating an overall configuration of a second embodiment according to the present invention, when viewed from the bottom.
Figure 8A:
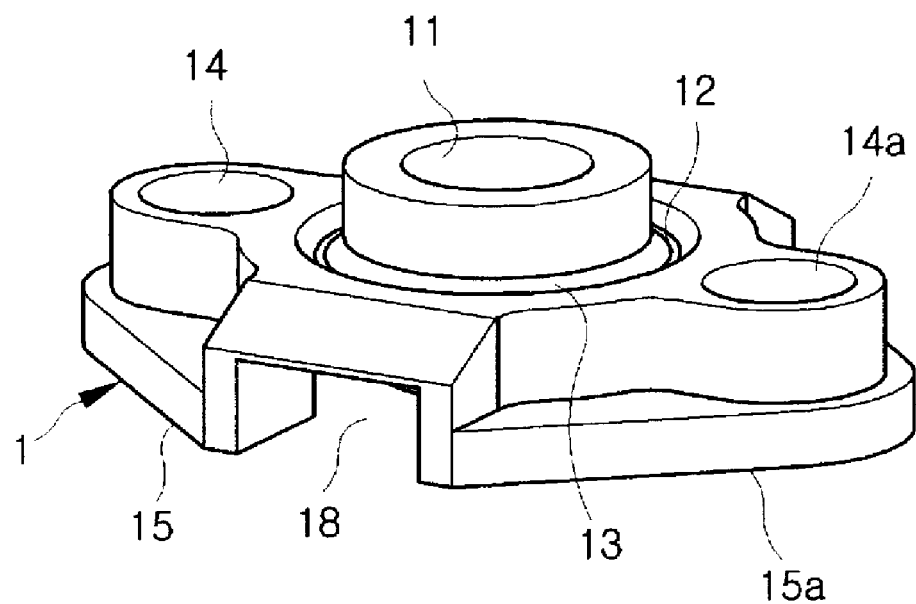
FIGS. 8A and 8B are, respectively, a perspective view and a sectional view illustrating a configuration of a sensor body of FIG. 7.
Figure 8B:
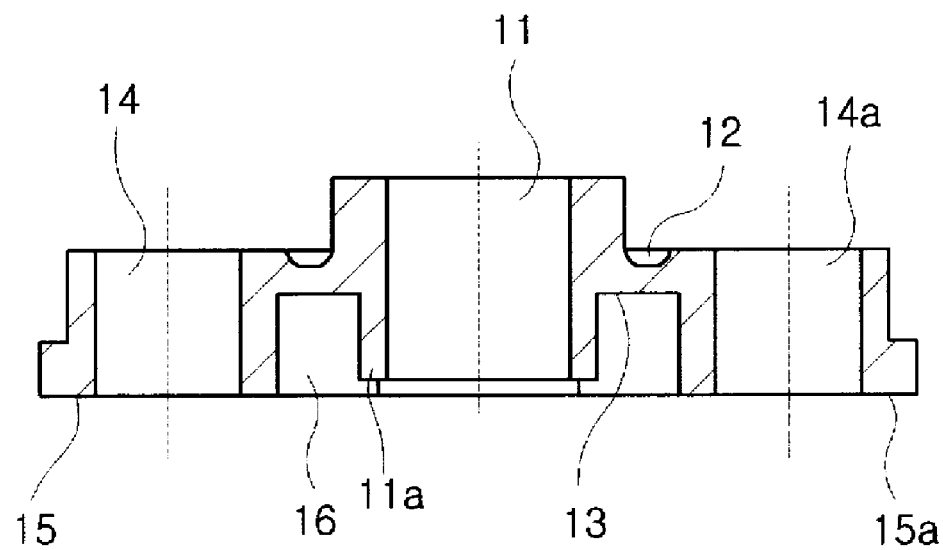

FIG. 7 is an exploded perspective view illustrating an entire configuration of a second embodiment according to the present invention, when viewed from the bottom, and FIGS. 8A and 8B are, respectively, a perspective view and a sectional view illustrating a configuration of a sensor body of FIG. 7.

As shown, the second embodiment of the present invention has the same configuration as the first embodiment except for a fixing boss 11a extending downward from the center hole 11 by a thick thickness in order to reinforce a lower edge of the center hole 11 of the diaphragm 13, through which a bolt is fastened.

Similar to the previously described first embodiment, the pair of fixing holes 14 and 14a for bolt-fastening of the sensor body 1 with the slide rail 200 below the seat frame 100 are formed at opposite sides of the center hole 11, and the diaphragm 13 including the center hole 11 is provided at the center of the sensor body 1. In this case, to assure easy operation of the diaphragm 13, the annular notch 12 is formed at the upper surface of the diaphragm 13 around the center hole 11.

In addition, the pair of supporting planes 15 and 15a containing the fixing holes 14 and 14a are located at opposite sides of the diaphragm 13 at a lower height than the diaphragm 13. The mounting recess 16 for insertion of the printed circuit board 3 is defined between the center hole 11 of the diaphragm 13 and the supporting planes 15 and 15a. The semiconductor strain gauge 2 is attached to the lower surface of the diaphragm 13 in the mounting recess 16.

The chip seating recess 17 for the chip 3a and the connector seating recess 18 for the connector 4 are provided at corresponding positions about the center hole 11 such that the chip seating recess 17 and connector seating recess 18 are arranged at opposite sides of the mounting recess 16 about the center axis of the center hole 11 perpendicular to the alignment axis of the center hole 11 and fixing holes 14 and 14a. Exteriors of the semiconductor strain gauge 2, printed circuit board 3, chip 3a and connector 4 are subjected to protective molding treatment.

With this configuration, in the second embodiment of the present invention, the fixing boss 11a, extending downward from the center hole 11 of the diaphragm 13, serves to prevent a variety of fine dirt and impurities from the outside from entering the mounting recess 16 into which the semiconductor strain gauge 2, printed circuit board 3, chip 3a and connector 4 are inserted.

Similar to the previously described first embodiment, if a passenger sits in a passenger seat, an operating load is applied to the diaphragm 13 of the sensor body 1, which is bolted to the seat frame 100 through the center hole 11, causing a strain of the diaphragm 13. The semiconductor strain gauge 2 attached to the lower surface of the diaphragm 13 measures the strain of the diaphragm 13, and the measured value is input to an airbag controller via the connector 4.

Also, similar to the previously described first embodiment, first to fourth pressure detecting elements $\epsilon 1$ to $\epsilon 4$ of the semiconductor strain gauge 2 are attached to the diaphragm 13 coaxial with the center hole 11 at opposite sides of the center hole 11 such that the first pressure detecting element $\epsilon 1$ and third pressure detecting element $\epsilon 3$ are first attached to correspond to each other. Subsequently, the second pressure detecting element $\epsilon 2$ and fourth pressure detecting element $\epsilon 4$ are attached to correspond to each other.

Figure 9:
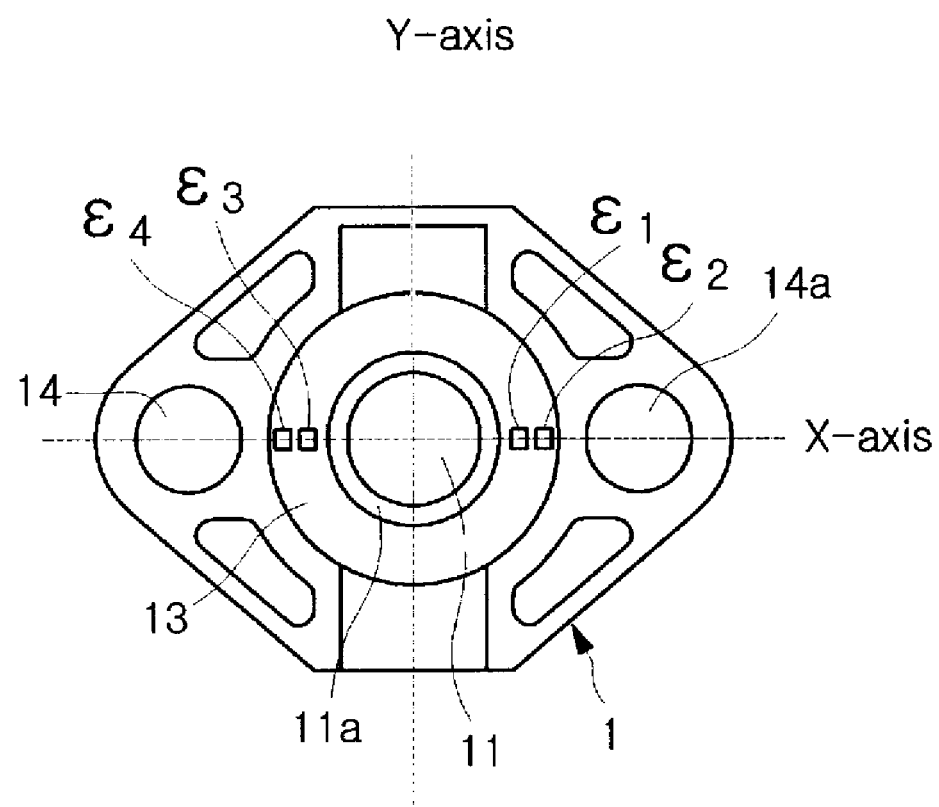
FIG. 9 is a layout diagram illustrating attachment positions of a semiconductor strain gauge of FIG. 7.

However, to fulfill both the above-described requirements related to operating load and temperature load, as shown in FIG. 9, the corresponding first and third pressure detecting elements $\epsilon 1$ and $\epsilon 3$ and the corresponding second and fourth pressure detecting elements $\epsilon 2$ and $\epsilon 4$ of the semiconductor strain gauge 2 may be sequentially attached to the diaphragm 13 at opposite sides of the center hole 11 along the X-axis passing through the center hole 11 and fixing holes 14 and 14a.

Figure 10A:
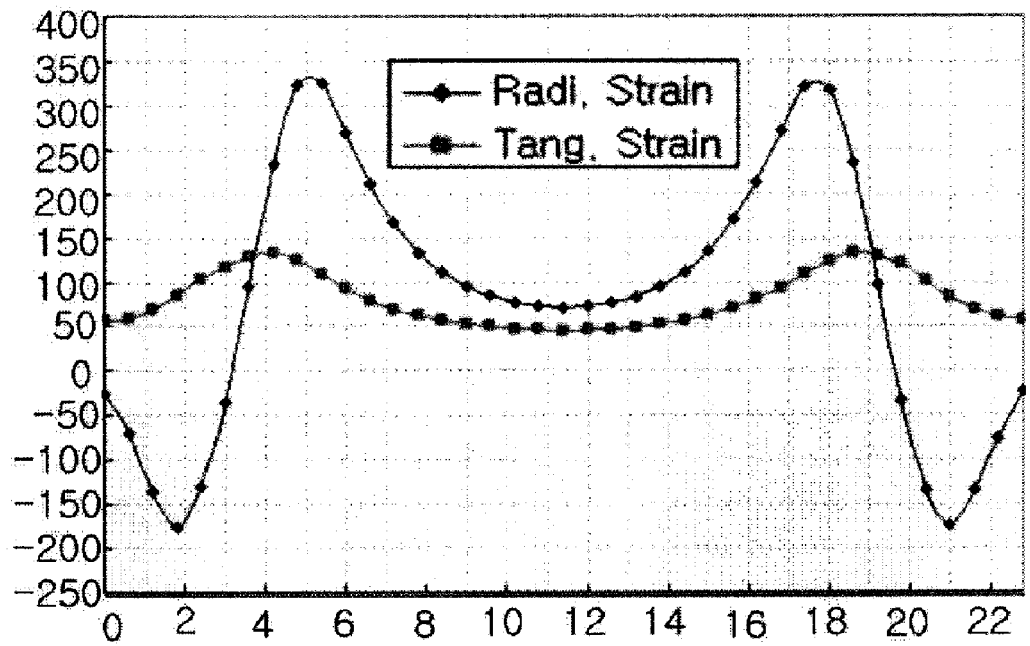
FIGS. 10A and 10B are graphs, respectively, illustrating a relationship between Y-axis strain measured by the semiconductor strain gauge and operating load and a relationship between the Y-axis strain and temperature load, on the basis of the layout of FIG. 9.
Figure 10B:
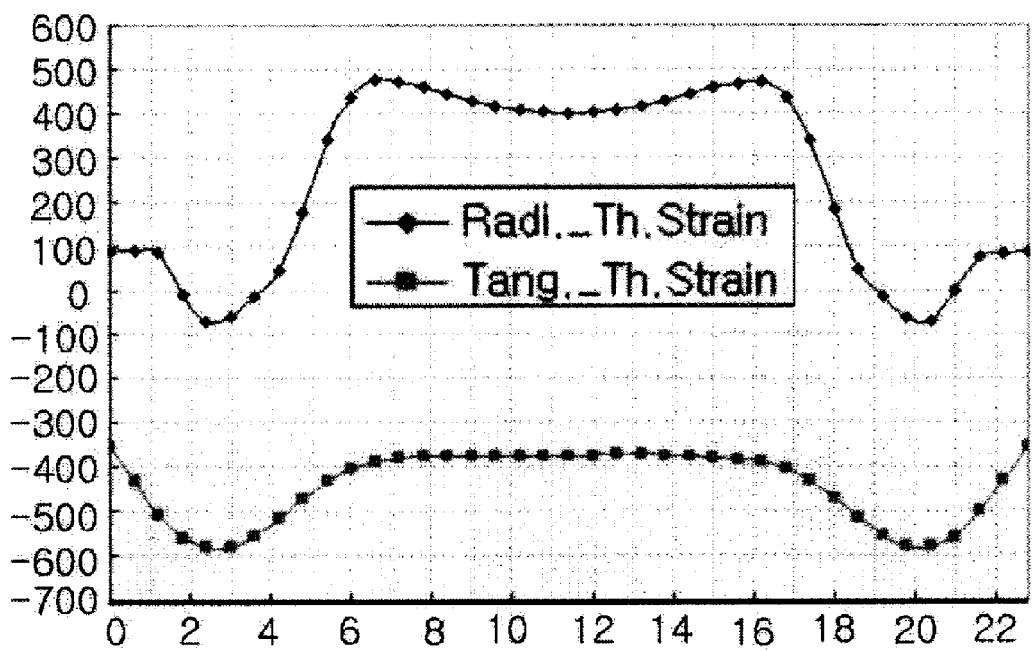
Figure 10C:
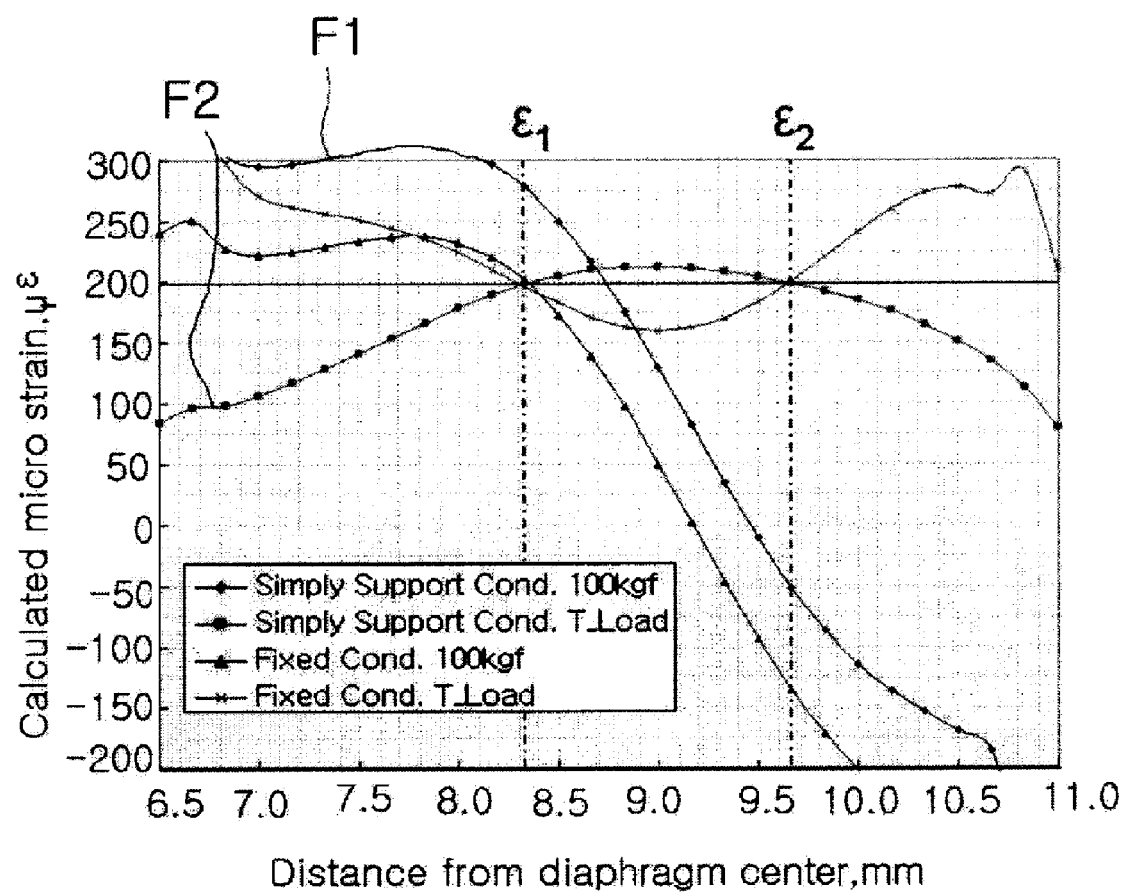
FIG. 10C is a graph illustrating an X-axis strain measured by the semiconductor strain gauge.

Specifically, although it is impossible to find, on the Y-axis, attachment positions of the semiconductor strain gauge simultaneously fulfilling both the requirements related to operating load and temperature load as shown in graphs of FIGS. 10A and 10B, it can be appreciated from the graph of FIG. 10C that both the requirements related to an operating load and temperature load can be fulfilled under the conditions wherein an operating load strain line F1 on the X-axis is measured to a positive value as the first pressure detecting element $\epsilon 1$ is stretched (increased) and the third pressure detecting element $\epsilon 3$ is contracted (decreased) at respective positions on a dash-dotted line and wherein a temperature load strain line F2 is located based on a criterion line of "200" and is measured to a zero value via equal thermal expansion and compensation.

Accordingly, in the first embodiment wherein no fixing boss is provided below the center hole, both the requirements related to opening load and temperature load can be fulfilled when the semiconductor strain gauge is located on the Y-axis. In the second embodiment wherein the fixing boss is provided below the center hole, both the requirements related to opening load and temperature load can be fulfilled when the semiconductor strain gauge is located on the X-axis.

As apparent from the above description, according to the present invention, a weight sensing device for vehicles is formed of a single body wherein a vertical load of a passenger is output in a direction eccentric to an input direction of the vertical load, thereby achieving a simplified configuration having a reduced overall height and consequently, a compact size of the weight sensing device. Accordingly, compatible and convenient installation and use of the weight sensing device in various kinds of vehicles having different seat heights and configurations can be accomplished.

Moreover, only the vertical load of the passenger can be accurately measured without interference of moment and lateral load caused upon sudden braking or a variation in traveling conditions of a vehicle, resulting in an improvement in the reliability and quality of the weight sensing device.

Although two embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A weight sensing device for vehicles comprising:
a sensor body having a center hole for fastening of the sensor body with a seat frame, a diaphragm provided around the center hole and secured to the seat frame through the center hole, a pair of fixing holes provided at opposite sides of the center hole and aligned with the center hole for fastening of the sensor body with a slide rail, supporting planes containing the fixing holes and located at opposite sides of the diaphragm, and a mounting recess defined between the diaphragm and the supporting planes;
a semiconductor strain gauge attached to a lower surface of the diaphragm;
a printed circuit board attached to the diaphragm of the sensor body; and
a connector electrically connected with the printed circuit board, to transmit a value output from the semiconductor strain gauge to an airbag controller,
wherein the semiconductor strain gauge measures strain on the diaphragm from an operating load applied from the seat frame.

2. The device according to claim 1, wherein the diaphragm has an annular notch formed at a surface thereof.

3. The device according to claim 1, wherein the semiconductor strain gauge includes first to fourth pressure detecting elements attached to the diaphragm at opposite sides of the center hole along a center axis of the center hole such that the first and third pressure detecting elements are first attached to correspond to each other and the second and fourth pressure detecting elements are attached to correspond to each other.

4. The device according to claim 1, wherein the semiconductor strain gauge includes first to fourth pressure detecting elements attached to the diaphragm at opposite sides of the center hole along a Y-axis, as a center axis of the center hole, perpendicular to an X-axis passing through centers of the center hole and fixing holes such that the first and third pressure detecting elements are first attached to correspond to each other and the second and fourth pressure detecting elements are attached to correspond to each other.

5. A weight sensing device for vehicles comprising:
- a sensor body having a center hole for fastening of the sensor body with a seat frame, a fixing boss protruding from the center hole in an opposite direction of the seat frame, a diaphragm provided around the center hole and secured to the seat frame through the center hole, a pair of fixing holes provided at opposite sides of the center hole and aligned with the center hole for fastening of the sensor body with a slide rail, supporting planes containing the fixing holes and located at opposite sides of the diaphragm, and a mounting recess defined between the diaphragm and the supporting planes;
- a semiconductor strain gauge attached to a lower surface of the diaphragm;
- a printed circuit board attached to the diaphragm of the sensor body; and
- a connector electrically connected with the printed circuit board, to transmit a value output from the semiconductor strain gauge to an airbag controller,
    wherein the semiconductor strain gauge measures strain on the diaphragm from an operating load applied from the seat frame.

6. The device according to claim 5, wherein the diaphragm has an annular notch formed at a surface thereof.

7. The device according to claim 5, wherein the semiconductor strain gauge includes first to fourth pressure detecting elements attached to the diaphragm at opposite sides of the center hole along a center axis of the center hole such that the first and third pressure detecting elements are first attached to correspond to each other and the second and fourth pressure detecting elements are attached to correspond to each other.

8. The device according to claim 5, wherein the semiconductor strain gauge includes first to fourth pressure detecting elements attached to the diaphragm at opposite sides of the center hole along an X-axis passing through centers of the center hole and fixing holes such that the first and third pressure detecting elements are first attached to correspond to each other and the second and fourth pressure detecting elements are attached to correspond to each other.

* * * * *